INVENTOR.
HENRY O. WOLCOTT
BY Harry R. Lubcke
AGENT

Feb. 18, 1969 H. O. WOLCOTT 3,428,912

WIDE-BAND DIRECT-CURRENT AMPLIFIER HAVING SERIES-CONNECTED OUTPUT VACUUM TUBES

Filed Jan. 22, 1968 Sheet 2 of 2

INVENTOR.
HENRY O. WOLCOTT
BY *Harry R. Lubcke*
AGENT

United States Patent Office 3,428,912
Patented Feb. 18, 1969

3,428,912

WIDE-BAND DIRECT-CURRENT AMPLIFIER HAVING SERIES-CONNECTED OUTPUT VACUUM TUBES

Henry O. Wolcott, Chatsworth, Calif., assignor to Optimation, Inc., Sun Valley, Calif., a corporation of California Filed Jan. 22, 1968, Ser. No. 699,570
U.S. Cl. 330—74 10 Claims
Int. Cl. H03f 1/32

ABSTRACT OF THE DISCLOSURE

A wide-band direct-current feedback amplifier having a pair of power output vacuum tubes with the cathode of the first ("upper") tube connected to the anode of the second ("lower") tube. This output connection is arranged to provide zero D.C. potential. An operational amplifier provides a high-gain and a differential input stage. It drives a D.C. level-shifting network which includes a constant current source. This results in minimum signal attenuation. The constant current source also cancels power supply ripple and variations acting at the cathode of the second tube by impressing these in-phase at the grid of the same tube. Transistors, which may be Darlington connected, act as couplings between the output of the level-shifting network and the grid of the second tube, as well as to an inverter stage vacuum tube, and also between that tube and the first power tube. These transistors act to minimize the Miller effect of the power output tubes and to provide low impedance driving circuits. They are energized by the voltage drop between the grid and cathode of each power tube. A positive current feedback connection in the amplifier gives it an effective zero output resistance. By floating the midtap of the power supply and sensing negative voltage feedback at the load, zero output resistance is made to be effective at a remote load.

*Background of the invention*

This invention pertains to a plural stage wide-band low-distortion amplifier that is effective from direct current to video frequencies and has series-connected output vacuum tubes.

The prior art has employed series-connected output tubes to feed a very low impedance load, such as the voice coil of a loudspeaker or the cutter of a phonograph recorder, without using the usual stepdown output transformer. In this practice, harmonic distortion of from one to several percent has been acceptable. The series-connected configuration does not possess certain distortion and hum reducing qualities possessed by the known push-pull output vacuum tube stage. The art has frequently ignored this situation in return for structural economy and/or reduction in phase distortion enhancing feedback possibilities, such as are made possible by eliminating the output transformer.

The art has not attempted, nor achieved, the production of a relatively "perfect" amplifier.

*Summary of the invention*

By employing novel and coactive means throughout, applicant has sought to provide the "perfect" amplifier; in that it reproduces an amplified output with very low distortion and uniform gain regardless of changes in power supply voltage, output impedance, temperature, or input waveform. Such an amplifier is valuable in the instrument calibration field, where it can be relied upon to merely amplify at fixed gain and with fidelity; being essentially independent of external circumstances.

Provision is made to provide zero output resistance for the amplifier, not only at its output terminals, but by means of "remote sensing" to provide zero output resistance at the load itself, thereby compensating for the resistance of connecting leads between the amplifier and the load. Such zero output resistance makes it impossible for the impedance characteristic of the load to back-act on the amplifier and change its characteristics. Since the effective output reactance of the amplifier is very low the zero output resistance characteristic results in essentially a zero output impedance characteristic.

The output tubes are driven by low impedance transistor circuits, thereby to isolate the known Miller effect of capacitance across the inputs of the output tubes and the variation of the same with the gain of the output stage and the impedance characteristic of its load.

A constant current source connected to the second (lower) tube of the output pair eliminates power supply hum and related problems therefrom and so allows an unregulated power supply to be employed for both of the power output tubes, with consequent economy in this heavy current power supply.

A fortuitous combination of vacuum tubes and transistors in this direct current amplifier results in the transistors being provided with energizing potentials by the voltages required to operate the vacuum tubes.

A very fast "slewing rate" (large signal rise time) is obtained because full output power is obtained over a wide bandwidth. The low impedance transistor drives for the power tubes with the concomitant isolation of the Miller effect largely accounts for this feature.

Very low waveform distortion, of the order of 0.01%, is obtained by arranging for high common mode rejection in the input amplifier stage and for a high degree of negative feedback over the whole amplifier. With a feedback factor of the order of 500 and an open loop distortion of 5%, the distortion is reduced to $5\%/500=0.01\%$.

Amplifier stability is insured by arranging all of the gain in the amplifier in two stages, thus obtaining minimum over-all phase rotation in the whole amplifier.

*Description of the preferred embodiment*

Figure 1:
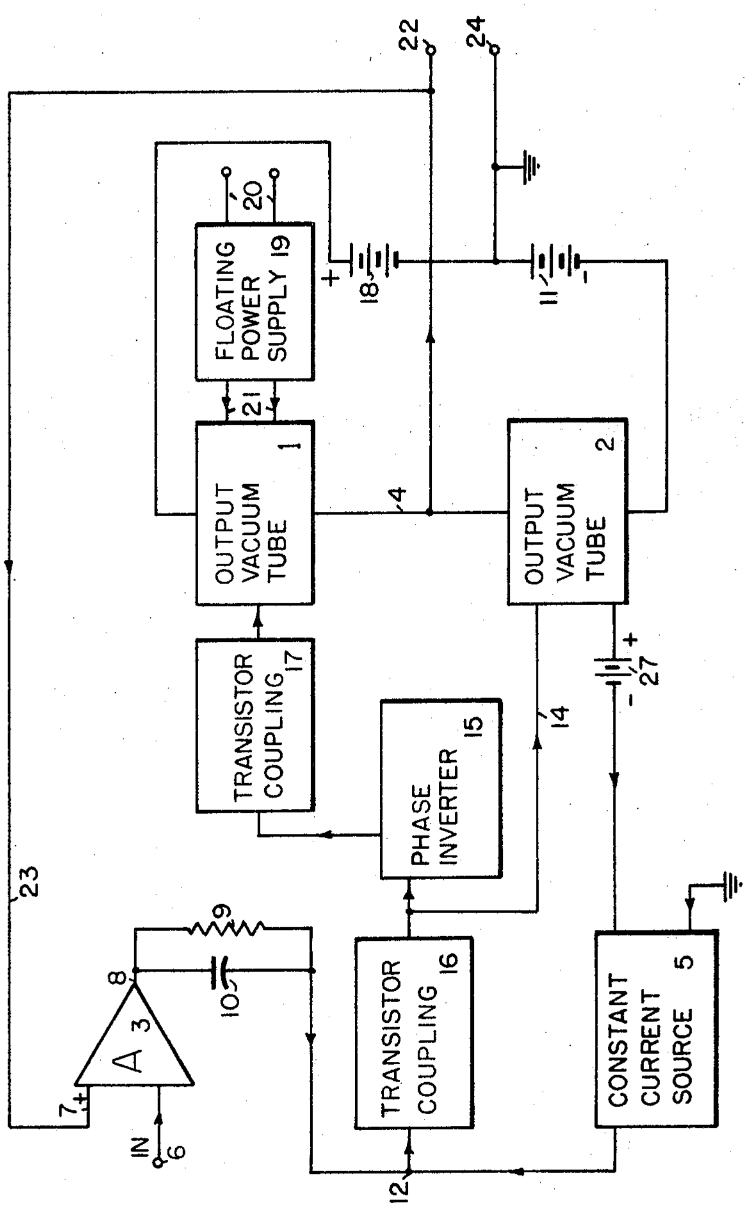
FIG. 1 is a block diagram of the amplifier of this invention.

In FIG. 1 numeral 1 indicates a first or "upper" vacuum tube, which may be of the triode, tetrode, pentrode, or other type. Numeral 2 indicates the second or "lower" vacuum tube, which is normally of the same type and characteristics as the first vacuum tube. The plate of tube 2 is connected to the cathode of tube 1 (see FIG. 2) by connection 4. Tubes 1 and 2 are normally power vacuum tubes and connection 4 is the output connection for the whole amplifier. Tubes 1 and 2, as represented in block form in FIG. 1 may each be comprised of two or more equivalent vacuum tubes connected in parallel for increased power output.

Operational amplifier 3 has the following external connections; signal input 6, feedback input 7 and output 8. Amplifier 3 is typically transistorized; having a pair of field-effect transistors ("FET's") in an impedance-reducing input stage, followed by a pair of NPN transistors in a high gain stage, a single NPN transistor in an emitter-follower output stage, and auxiliary transistors connected to the pair of NPN transistors as constant current generators to enhance the linearity of their amplification characteristic and so to reduce distortion.

One such generator is in the common emitter circuit of the NPN transistors and the other is in the collector circuit of the transistor of this pair from which the amplified output is taken. Two more transistors connected in the nature of a Darlington pair feed back to the drains of the FET input stage transistors and alter the potential of the same consonant with the signal frequency variations in the common mode of the gates of the FET's, whereby distortion caused by variation of the position of the dynamic operating point on the amplification characteristic is essentially eliminated.

Amplifier 3 may be a known small low power encapsulated operational amplifier commercially obtainable as the Optical Electronics, Inc. Model 9186, or the Nexus, type FSL-5. Direct current balance of the operational amplifier 3, and of the whole amplifier of this invention as well, is accomplished by known connection of potentiometer 13, having a resistance of 20,000 ohms. See FIG. 2.

A resistor 9, of 150,000 ohms having a high frequency capacitance correction capacitor 10 of 180 picofarads shunted across it, is connected from output connection 8 of the operational amplifier to the output of constant current source 5. The resistor acts as the upper leg of a voltage divider for which the constant current source is the lower leg. Since the impedance of the constant current source is very much larger than the resistance of the resistor, a change of D.C. potential from the output of the operational amplifier is achieved without a significant loss of A.C. signal level.

A connection is made from the cathode of vacuum tube 2 (see FIG. 2) to an input of constant current source 5 to eliminate hum (ripple) and other variations from unregulated power supply 11, which has been shown as a battery. A small floating regulated power supply 27 is included in this connection to provide a further negative D.C. potential for elements 5, 15 and 16, and therethrough a suitable negative bias for the control grid of tube 2. Ground is the other input to source 5.

Point 12, on the lead between resistor 9 and constant current source 5 is at high impedance. Thus, to effectively drive the grid of vacuum tube 2 at frequencies in excess of 10,000 hertz (cycles per second) via connection 14, and to similarly drive phase inverter 15, transistor coupling entity 16 is interposed. This may be a single transistor, or a Darlington pair.

Phase inverter 15 is typically a tetrode, having plate output, which connects to a second transistor coupling entity 17. This may be a duplicate of entity 16, and is employed so that vacuum tube 1 will be driven at low impedance.

The plate of vacuum tube 1 is energized by unregulated power supply 18, shown as a battery. The cathode of this vacuum tube varies at signal voltage, being connected to connection 4. When tube 1 is a tetrode or a pentode, floating screen power supply 19 must be employed. Such a power supply is known. It may be comprised if input terminals 20, typically connected to a power line of 120 volt 60 cycle per second alternating current, which in turn is connected to a transformer within the power supply having an air gap between primary and secondary windings to minimize capacitance between the alternating power supply and both of the D.C. output terminals 21, which must vary at signal voltage. Also typically included within the power supply are four diodes connected to the secondary of the transformer in a bridge-rectifying circuit, a resistive-capacitive filter, and a voltage regulating transistor.

Connection 4 is connected to "high" output terminal 22, and through conductor 23 to feedback connection 7 at the input to operational amplifier 3 to provide negative feedback over the whole amplifier. With the preferred pair of FET's differentially connected as previously mentioned as within amplifier 3, the base of one thereof is connected to input terminal 6 while the base of the other is connected to feedback connection 7.

The "low" output terminal 24 is connected to ground and also to the center tap between power supplies 11 and 18. This arrangement, and the rest of the circuitry concerned, results in the output D.C. potential being at ground potential. This is an advantage that the art has frequently foregone in exchange for intra-amplifier simplicity.

Figure 2:
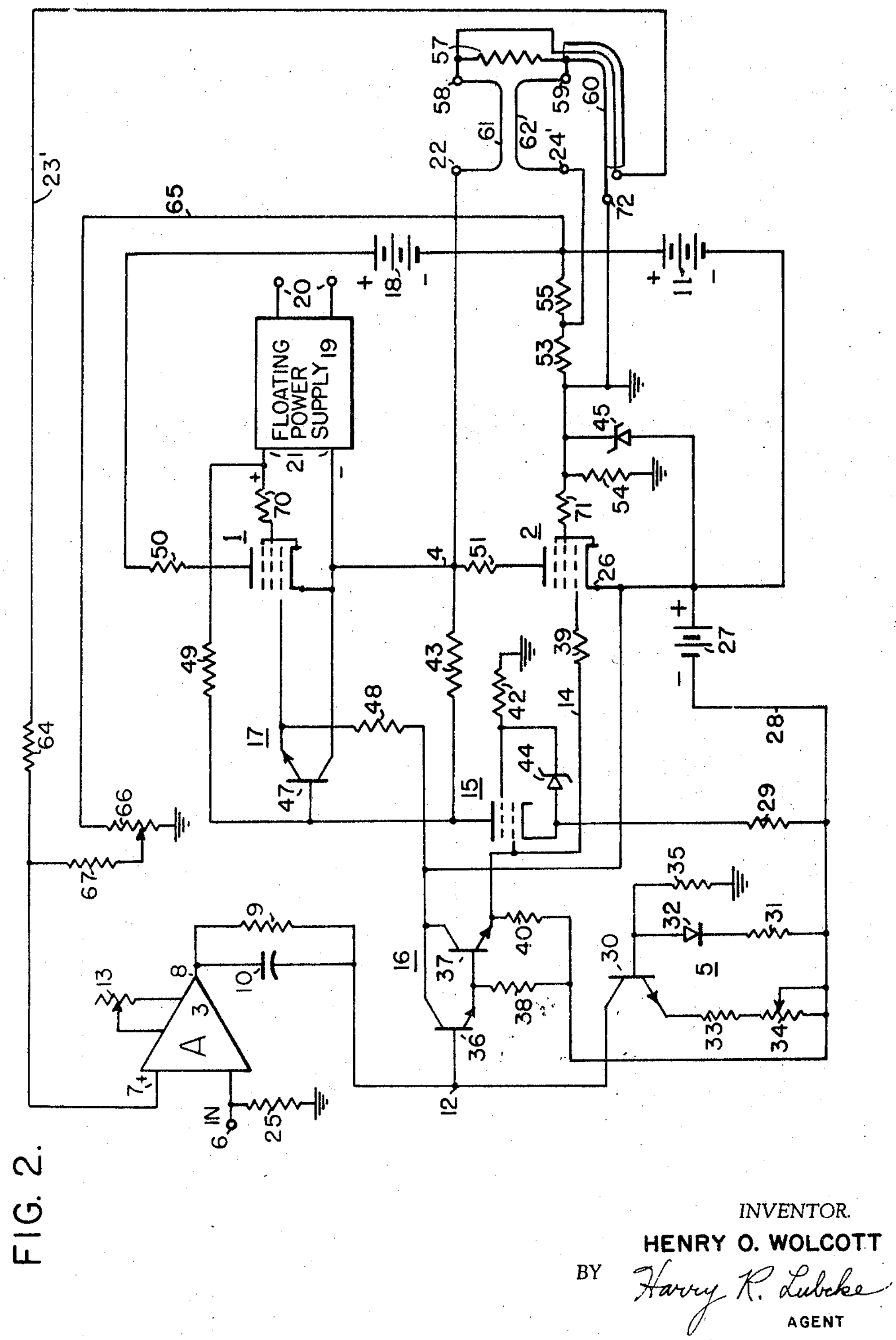
FIG. 2 is a schematic diagram of a vacuum tube and transistor embodiment of the invention.

FIG. 2 schematically details the whole amplifier.

The direct current and/or alternating current signal to be amplified is impressed at terminal 6 as a voltage with respect to ground over resistor 25, which may have a large resistance value, of the order of 20 megohms. The signal is amplified and inverted in phase by operational amplifier 3, and appears at output connection 8. From here it passes through the voltage divider for D.C. 9 (and 10) and constant current source 5 as has been explained. This provides proper operating potentials for this all D.C. amplifier of this invention.

The principal input to constant current source 5 is from cathode 26 of output vacuum tube 2. This is taken through regulated power supply 27, shown as a battery in FIG. 2, the negative terminal of which connects to source 5 through conductor 28. The positive terminal of supply 27 floats at the maximum negative voltage for the output tubes, say at —300 volts. Thus a transformer is required to isolate supply 27 from the alternating current power line. However, the useful signal being amplified is not present at cathode 26, particularly the high frequencies thereof; thus, a low capacitance transformer and low capacitance construction of power supply 27 is not required.

Constant current source 5 acts to eliminate the effect of power supply shifts in main supply 11 due to line voltage variations, also power supply ripple, and other extraneous signals. The latter include remnants of signal frequency due to current through tube 2 arising as a voltage across the (relatively low) impedance of power supply 11, which remnants are hereinafter referred to as "noise" signals. The constant current source is effective from D.C. through the higher audio frequencies in removing the effects of all of the spurious variations mentioned, and harmonics thereof.

Power supply 27 impresses a negative potential upon cathode resistor 29, of 1,000 ohms, of phase inverter 15; also upon the base and emitter of transistor 30 of constant current source 5, thereby providing a proper negative bias upon the control grid of tube 2. An appropriate voltage for supply 27 is —36 volts in the embodiment illustrated. It will be understood that in a fully direct coupled amplifier, effective to zero frequency, potential-determining elements of the type of supply 27 are required to provide proper operating potentials for the several elements of the whole circuit.

A fraction of the unwanted noise signals on the —300 volt power supply at cathode 26 of tube 2 is applied to the base of transistor 30 through the negligible impedance of power supply 27 and through voltage divider 31, (32) and 35. The fraction of noise signals applied to the base of transistor 30 is determined by the resistance ratio of resistor 35 to the sum of the resistance of resistors 31 and 35. The dynamic resistance of diode 32 is negligible. It is in the conductive mode.

Thus, if the ratio of the resistance of resistor 9 to the resistance of resistors 33 and 34 in series is made numerically equal to the fraction of the noise signal applied, the gain of transistor 30 will be one. A noise voltage will thus appear at the collector of transistor 30 that is equal to and in phase with the noise voltage at cathode 26. This is impressed substantially without loss through transistor coupling 16 to the control grid of output tube 2, thereby cancelling the effect of spurious power supply signals on tube 2. Resistor 34 provides an adjustment for the value of the constant current of source 5, whereby to set the level of the quiescent voltage at output 8 such that the maximum undistorted voltage output swing can be obtained from operational amplifier 3.

Resistor 31 may have a resistance of 4,400 ohms. Diode 32 may be the 1N625 type and is included to make the constant current source essentially insensitive to ambient temperature changes. The second input, of ground potential, to the constant current source is accomplished through resistor 35, of 300,000 ohms, which is connected between the base of transistor 30 and ground. Resistor 33 may have a resistance of 2,000 ohms and variable resistor 34 a maximum resistance of 1,000 ohms; these being connected in series between the emitter of transistor 30 and the negative terminal of power supply 27. Minor factory adjustment of the resistances of resistors 31 and/or 35 may be made to insure that the gain of the constant current source transistor 30 shall be such as to give exactly a gain of one between the control grid and the cathode of tube 2 and thus exact cancellation of the unwanted signals.

In obtaining the temperature compensation mentioned, the object is to maintain the current flow through source 5 constant. As the temperature rises the "constant" current tends to rise because the voltage drop between the emitter of transistor 30 and the negative terminal of power supply 27 increases. Assuming that the base of the transistor is clamped at a particular voltage, the constant current is proportional to the voltage drop between the emitter and conductor 28 divided by the resistance of the emitter circuit resistors 33 and 34. This quantity is temperature sensitive due to the change in forward bias voltage ($V_{be}$) with temperature. With diode 32 in the base circuit the same temperature change affects the voltage drop of the diode to the same degree. This alters the clamp voltage on the base to nullify the change in the emitter-base voltage drop and thus to keep the constant current constant.

The collector of transistor 30 is connected to that end of resistor 9 that is away from output connection 8 of the operational amplifier 3. It was mentioned in connection with FIG. 1 that point 12 (this connection) is at high impedance; not at all suited for driving a power tube according to this invention. In FIG. 2, transistor coupling 16 is detailed as a Darlington pair of transistors to transform this impedance downward in value.

The base of firsf transistor 36 is directly connected to point 12 to accept the relatively high impedance input. The emitter of transistor 36 is connected directly to the base of transistor 37 and also to resistor 38, of 10,000 ohms resistance, and therethrough to the common negative return at the output of power supply 27. The emitter of transistor 37 connects to both the control grid of phase inverter vacuum tube 15 and the control grid of output vacuum tube 2. The latter is connection 14, and adjacent to the control grid of tube 2 includes resistor 39, of 10 ohms, a known anti-parasitic (or anti-oscillation) resistor. The emitter of transistor 37 is also connected to resistor 40, of 5,100 ohms resistance, and therethrough to the common negative return at the output of power supply 27. The collectors of transistors 36 and 37 are connected together and to cathode 26 of output tube 2. This completes the circuit, whereby the incoming signal from output 8 is applied across control grid to cathode in both tubes 2 and 15. Resistor 29, in the cathode circuit of phase inverter 15 sets the quiescent current level of that tube. Transistor 36 may be a 2N4259 and transistor 37 a 2N3512, both of the NPN type.

Darlington pair 16 reduces the impedance at point 12, of the order of .15 megohm to the order of 20 ohms at the control grid to cathode inputs of tubes 2 and 15. This low driving impedance makes the Miller effect capacitance reflected back to the inputs of these tubes of negligible effect, thereby stabilizing the characteristics of the internal circuits of the amplifier regardless of the magnitude and phase angle of the load connected to the output of the power tubes.

In tube 15 a regulated screen to cathode supply voltage is obtained by connecting the screen through resistor 42, of 100,000 ohms resistance, to ground, and Zener diode 44 with the anode thereof to the cathode of tube 15. This diode may be of the 1N3041B type, having a 75 volt breakdown voltage at which it regulates.

The plate of tube 15 is connected to the cathode of tube 1 through resistor 43, of 1,150 ohms and to the screen of tube 1 through resistor 49, of 12,100 ohms, for plate voltage supply. In addition, resistors 43 and 49 act as the plate resistor over which the output signal voltage of the phase inverter stage is developed. Vacuum tube 15 may be of the RCA 7868 type. As connected, it drives tube 1 from control grid to cathode regardless of signal variations on the cathode caused by the operation of tube 2.

The cathode to screen voltage of vacuum tube 2 is fixed at 100 volts by Zener diode 45, which is connected between these electrodes; and resistor 54, which is connected from screen to ground. Zener diode 45 may be of the 1N3005B type and resistor 54 may have a resistance of 5,000 ohms.

The cathode to screen voltage of vacuum tube 1 is fixed at 100 volts by regulated floating power supply 19.

The plate of phase inverter 15 is directly connected to the base of transistor 47 of transistor coupling entity 17. The emitter of the transistor is connected to the control grid of output tube 1; which tube, along with tube 2, may be the Amperex type 7534. This emitter is also connected to resistor 48, of 33,000 ohms, and therethrough to the cathode 26 of tube 2, thus to the −300 volt supply. Typically, transistor 47 is a 2N3512 type, and the potential at its emitter is approximately −15 volts with respect to the cathode of tube 1; this being a sutiable grid bias for the control grid of output tube 1.

When the whole amplifier is D.C. balanced, tubes 1 and 2 must draw equal current. The bias on each tube will automatically adjust to the proper value for each tube to bring this about. The average bias and hence the quiescent current is determined by the absolute voltage values of power supplies 19 and 27; being directly proportional to the voltage of supply 19 and inversely proportional to the voltage of supply 27. This current is also proportional to the resistance values of resistors 29, 43, 49, and to a lesser extent resistor 42.

In order that tube 1 be driven with an equal and opposite phased signal with respect to tube 2, tube 15 must have a gain of 1. This requirement is satisfied when the parallel combination of resistor 29 and 42 equals the parallel combination of 48 and 49 in resistance values. The quiescent current may be most conveniently adjusted by varying the voltage output of power supply 27.

Resistor 50 is connected to the plate of tube 1 and resistor 51 to the plate of tube 2. These are merely anti-parasitic resistors and have a resistance of 10 ohms each. Similarly, resistors 70 and 71, of 39 ohms each, are anti-parasitic resistors in the screen leads of these tubes. The suppressor grid, adjacent to the plate, in each tube is connected to the cathode, as known.

The positive terminal of D.C. power supply leads 21 connects to the screen of output tube 1 and the negative terminal connects to the cathode. The collector of transistor 47 is also connected to the cathode of tube 1.

The positive terminal of power supply 18, normally of 300 volts potential, connects to the plate of tube 1 through resistor 50. Similarly, the negative terminal of power supply 11, also normally of 300 volts potential, connects to the cathode 26 of tube 2. These power supplies are typically unregulated and are of known construction. They are shown as batteries in the figures for simplicity and as possible alternates.

FIG. 1 illustrates a simple embodiment of the output circuit for the whole amplifier, while FIG. 2 includes remote sensing for feedback at the load, thereby to accomplished effective zero internal resistance for the amplifier as referred to the load.

Thus, in FIG. 2 the center tap between power supplies 11 and 18 does not connect directly to ground as in FIG. 1, but through resistors 53 and 55, each having a resistance of the order of 1 ohm. Also, "ground" output terminal 24' is not now directly connected to ground, but through resistor 53.

The load itself is represented by resistor 57, typically having a resistive impedance of 575 ohms, but it may have any phase angle and a magnitude of from 250 ohms to megohm values. New terminals are provided for the load; these being 58 for the high terminal and 59 for the ground terminal. Conductor 60 connects terminal 59 and the lower terminal of the load directly to ground. Terminal 58 is connected to the upper terminal of the load and to negative feedback conductor 23'.

Lead 61 connects terminal 22 to terminal 58 and lead 62 connects terminal 24' to terminal 59. These leads are the connections from the amplifier to the load and may have a length of up to 10 feet without compensation. This length may be increased up to 100 feet with high frequency phase compensation. Normally these leads are of relatively heavy wire to conduct the currents that may be involved in multiwatt embodiments and may be twisted into a twisted pair. Similarly, conductor 60 may be the outer conductor of a coaxial cable, of which conductor 23' is the inner conductor in the run from amplifier to load. In this conductor resistor 64 is included. It has a resistance of the order of 50,000 ohms. It is also included in the embodiment of FIG. 1, but has not been shown because of the simplified nature of that figure.

In FIG. 2 an additional lead 65 for positive current feedback connects from the 11–18 center tap to potentiometer 66, the latter having a total resistance of 100 ohms. The moveable arm of the potentiometer is connected to resistor 67, of 2,600 ohms, and the latter is connected to feedback terminal 7 of operational amplifier 3.

These resistor values yield a closed loop gain of approximately 20 times. Higher gains may be achieved by suitably proportioning the values of resistors 64 and 67 in accordance with the known expression for the non-inverting or voltage-follower case where the open loop gain is much greater than the closed loop gain. This is:

$$\frac{V_o}{V_i} = +\frac{R_f + R_1}{R_1}$$

where:

$V_o$=voltage output
$R_f=R_{64}$
$V_i$=voltage input
$R_1=R_{67}$

With the non-inverting configuration the maximum input voltage is limited typically to less than plus or minus 10 volts peak due to the limitation on common mode signal acceptance.

With this limitation on the input signal and a desirable maximum output is plus or minus 200 volts it would not be desirable to have a gain of less than 20. If lower gains are desired without loss of maximum voltage swing then the inverting configuration can be used for operational amplifier 3. The signal input is then applied through a resistor to the junction of resistors 64 and 67; i.e. to terminal 7. Input 6 may then be grounded or employed as the second terminal of a differential input.

The input impedance of operational amplifier 3 may be many megohms for the normal non-inverting configuration, but for the inverting configuration it is only of the order of 2,500 ohms for the same gain of 20.

The negative feedback path in the whole amplifier accomplishes increased fidelity of amplification, as is known. The positive current feedback path, also included, provides zero effective resistance for the output of the amplifier by canceling a part of the negative feedback as a function of loading the amplifier. When an ordinary amplifier is progressively loaded it is normal for the output to drop slightly in spite of negative feedback employed. In this invention, wherein the negative feedback is reduced under such conditions the output rises; thus canceling the effect of loading. The positive feedback produced herein is out of phase with the negative feedback, thus acting directly to reduce the negative feedback. The magnitude of the positive feedback is determined by the load current and this is translated into a voltage by placing a resistor of relatively low resistance in series with the load. While the effect of this feedback is to provide an apparent zero output resistance for the amplifier it has no effect on the optimum value of load resistance equal to amplifier resistance of 575 ohms for the present embodiment.

Potentiometer 66 allows adjustment of the regulation. A position can be found where the apparent internal resistance of the amplifier is zero. For a position of the potentiometer contact nearer to the ground terminal the regulation will be positive, or not fully compensated for variations in load resistance. For a position of the potentiometer contact farther from the ground terminal the regulation will be negative, or overcompensated for variations in load resistance. The total resistance of resistor 66 is preferably limited to a small fraction of the resistance of resistor 67 so that adjustment of the resistance of resistor 66 will not alter the gain of the whole amplifier by significantly altering the negative feedback resistances involved.

Resistor 55 has the function of sensing the current through the load and developing a voltage proportional to the current for positive feedback purposes. Resistor 53 has a protective function when the remote sensing mode of operation is employed. The circuit provides the equivalent of additional positive feedback to cancel the effect of the resistance of the lead 62 from amplifier to remotely located load. When the load is not remotely located resistor 53 is shorted out by a ground connection to the load made from terminal 72 to 24'.

Measurements on an embodiment of the invention show the apparent output impedance of the whole amplifier to have a resistive component of zero ohms and an inductive reactance corresponding to an inductance of 0.4 microhenry. This inductive reactance is very small. At a frequency of 1 megacycle per second it has a value of only 3 ohms. Since the optimum load impedance is 575, this reactance is substantially less than 1% thereof, and it is essentially true that the feedback effective in providing zero apparent resistance also provides zero apparent impedance.

Certain modifications of the embodiments described are possible.

Transistor coupling 16 of FIG. 1 has been detailed in FIG. 2 as a Darlington pair of transistors, while transistor coupling 17 has been detailed as a single transistor. These alternates may be used inter-changeably; both may be single transistors, both may be Darlington pairs, or coupling 16 may be a single resistor and coupling 17 a Darlington pair. The requirement of low impedance drive and thereby the substantial elimination of Miller capacitance feedback effects will be met by either alternate. The Darlington pair has the advantage of greater impedance transformation than one transistor. However, one transistor is sufficient to give required impedance transformation and minimizes the Miller capacitance effect sufficiently for a simplified practical embodiment.

Also, the power type Zener diode 45, having a rating of 10 watts may be replaced by a usual Zener diode, having a rating of 400 milliwatts and a cathode-follower triode connected thereto to enhance the current capability required. This alternate reduces the average D.C. power drain.

The nominal power output at very low level distortion according to this invention for the embodiment described herein is 25 watts. With paralleled output tubes or with output tubes of greater power capability the power output can be made many times the 25 watts, almost without limit.

It will be understood that the amplifier of this invention is a true direct current amplifier. It is direct-coupled from input to output. It accepts a voltage input and provides a voltage output at zero volt in the quiescent state with respect to ground.

I claim:

1. A wide-band direct-current amplifier comprising;
(a) an operational amplifier (3), having an input connection (6) for said direct-current amplifier as a whole, an output connection (8), and a feedback connection (7),
(b) a first (upper) output vacuum tube (1) having a cathode, a grid and a plate,
(c) a second (lower) output vacuum tube (2) having a cathode, a grid and a plate,
(d) a source of energizing potential (11, 18) connected between the plate of said first tube and the cathode (26) of said second tube,
(e) an output connection (4) for said direct-current amplifier connected between the cathode of said first tube and the plate of said second tube,
(f) a constant current source (5) having two inputs and an output (12),
(g) a connection from one said input to the cathode (26) of said second vacuum tube,
(h) a connection from the other said input to ground,
(i) a connection from the output (12) of said constant current source to the output connection (8) of said operational amplifier, and to the grids of said first and second vacuum tubes, and
(j) a connection (23) from the cathode of said first tube to said feedback connection (7) of said operational amplifier (3) to provide finite amplification.

2. The amplifier of claim 1, which additionally includes;
(a) means to drive (15) said first vacuum tube with a signal, and
(b) a transistor (47) connected as an amplifier between the output of said means to drive and the grid of said first vacuum tube.

3. The amplifier of claim 2 in which said transistor (47) is of the NPN type and said means to drive (15) is a vacuum tube, and which additionally includes;
(a) a connection from the base of said transistor to the plate of the vacuum tube of said means to drive (15),
(b) a connection from the emitter of said transistor to the grid of said first vacuum tube, and
(c) a connection from the collector of said transistor to the cathode of said first vacuum tube,
whereby said transistor is powered by differences in potential at the elements to which connections are made.

4. The amplifier of claim 1, which additionally includes;
(a) a Darlington pair (16) of transistors having an input and an output,
said input connected to the output (12) of said constant current source (5), and said output connected to both the grid and cathode of said second vacuum tube (2).

5. The amplifier of claim 4, in which the Darlington pair includes the following connections;
(a) the base of the first transistor (36) of the pair is connected to the output of said constant current source (12),
(b) the emitter of said first transistor is connected to the base of the second transistor (37),
(c) the emitter of said second transistor is connected to the grid of said second vacuum tube (2), and
(d) the collectors of both said transistors are connected to the cathode (26) of said second vacuum tube.

6. The amplifier of claim 1, which additionally includes;
(a) a phase inverter (15) having an input, and connections to drive said first vacuum tube (1), and
(b) transistor means (16) connected between the output (12) of said constant current source (5) and the input of said phase inverter.

7. The amplifier of claim 1, which additionally includes;
(a) a resistor (9),
(b) a capacitor (10) connected in parallel with said resistor,
(c) a connection from said resistor and capacitor to said output connection (8) of said operational amplifier (3), and
(d) a connection from said resistor and capacitor to said output (12) of said constant current source (5),
whereby said resistor and capacitor act as a connecting link.

8. The amplifier of claim 1, wherein said constant current source (5) comprises;
(a) a transistor (30),
(b) a diode (32) and a resistor (31) connected in series,
(c) a connection from the cathode (26) of said second vacuum tube (2) through said diode in conductive polarity and said resistor to the base of said transistor (30),
(d) a resistor (35) connecting said base to ground,
(e) a resistor (33, 34) connecting the emitter of said transistor (30) to the cathode (26) of said second vacuum tube, and
(f) a connection from the collector of said transistor (30) to said output (12) of said constant current source,
whereby extraneous signals present at the cathode (26) of said second vacuum tube (2) are removed from the output connection (4) of said amplifier.

9. The amplifier of claim 1, which additionally includes;
(a) a load (57),
(b) a first lead (61) connected from said first output tube (1) to one terminal of said load, whereby said feedback connection (7) is connected to said first output tube through said first lead to provide negative feedback,
(c) a second lead (62) having impedance (53) connected from the other terminal of said load to ground, and
(d) a resistive circuit (65, 66, 67) connected from said second lead at the end away from said load to said feedback connection (7),
whereby positive feedback is impressed upon said amplifier to reduce the effective output resistance thereof.

10. The amplifier of claim 1, which additionally includes;
(a) a load (57) remotely located from said amplifier,
(b) a first lead (61) connected to one terminal of said load, and second (62) and third (60) leads connected to the other terminal of said load,
(c) said first lead connected to the cathode connection (4) of said first output tube (1),
(d) a D.C. power supply (11, 18) connected to said first and second output tubes and having a voltage center tap,
(e) a first resistive connection (53, 55) between said center tap and ground,
(f) a second resistive connection (55) between said second lead (62) and said center tap,
(g) said third lead (60) connected to ground, (h) said feedback connection (23′, 64, 7) connected to the cathode of said first output tube through said first lead (61), and (i) a resistive circuit (65, 66, 67) connected from that end of said second lead (62) which is connected to said second resistive connection (55) to said feedback connection (7) of said operational amplifier (3) to provide feedback sensed at said remotely located load.

References Cited

UNITED STATES PATENTS 2,773,136 12/1956 Futlerman ---------- 330—70
3,092,783 6/1963 Krohn -------------- 330—98

NATHAN KAUFMAN, *Primary Examiner.*

U.S. Cl. X.R.

330—3, 112, 199